United States Patent
Harada

(10) Patent No.: US 10,620,897 B2
(45) Date of Patent: Apr. 14, 2020

(54) COMPARISON PROGRAM, AND COMPARISON DEVICE

(71) Applicant: FUJITSU LIMITED, Kawasaki-shi, Kanagawa (JP)

(72) Inventor: Kazuyuki Harada, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 127 days.

(21) Appl. No.: 15/954,836

(22) Filed: Apr. 17, 2018

(65) Prior Publication Data
US 2018/0329666 A1 Nov. 15, 2018

(30) Foreign Application Priority Data
May 11, 2017 (JP) .................. 2017-094580

(51) Int. Cl.
| G06F 3/14 | (2006.01) |
| G06T 7/00 | (2017.01) |
| G06T 7/254 | (2017.01) |

(52) U.S. Cl.
CPC .......... *G06F 3/1415* (2013.01); *G06T 7/0002* (2013.01); *G06T 7/254* (2017.01); *G06T 2207/10016* (2013.01); *G06T 2207/10024* (2013.01)

(58) Field of Classification Search
None
See application file for complete search history.

(56) References Cited

U.S. PATENT DOCUMENTS

| 6,539,106 B1 * | 3/2003 | Gallarda .............. G01R 31/307 382/149 |
| 2010/0020244 A1 * | 1/2010 | Mitsuya .............. H04N 5/23248 348/699 |
| 2014/0176394 A1 * | 6/2014 | Horiuchi ............... G06F 3/1415 345/1.3 |
| 2018/0261184 A1 * | 9/2018 | Ninan .................... G09G 5/005 |

FOREIGN PATENT DOCUMENTS

| JP | 2000-276593 A | 10/2000 |
| JP | 2006-191365 A | 7/2006 |
| JP | 2007-86899 A | 4/2007 |

* cited by examiner

*Primary Examiner* — Fayyaz Alam
(74) *Attorney, Agent, or Firm* — Westerman, Hattori, Daniels & Adrian, LLP

(57) ABSTRACT

A comparison apparatus includes: a memory configured to store instructions; and a processor configured to execute the instructions stored in the memory, the instructions causing the processor to perform a comparison process including: detecting a different portion between a reference image and a comparison target image by comparing the reference image and the comparison target image; and setting at least one of the different portion and a region in a vicinity of the different portion as a non-target region to be detected as the different portion when compared with the reference image.

10 Claims, 30 Drawing Sheets

FIG. 12

| | | |
|---|---|---|
| 1. EXECUTION TIME | : AM | 10:47 |
| 2. EXECUTION RESULT | : NORMAL | |
| 3. RESULT DETAILS | : AAA ··· | |

FIG. 13

1. EXECUTION TIME     : AM          10:49

2. EXECUTION RESULT   : NORMAL

3. RESULT DETAILS     : AAA ⋯

FIG. 14

```
┌─ UN11
│
   1. EXECUTION TIME      : AM        10:47

2. EXECUTION RESULT    : NORMAL

3. RESULT DETAILS      : AAA ⋯
```

FIG. 15

```
┌─ UN21
│
│   1. EXECUTION TIME      : AM        10:49
│
│   2. EXECUTION RESULT    : NORMAL
│
│   3. RESULT DETAILS      : AAA ···
│
└─────────────────────────────────────────────
```

1. EXECUTION TIME      : AM          10:49

2. EXECUTION RESULT    : NORMAL

3. RESULT DETAILS      : AAA ···
```

FIG. 17

```
                                                EX31
1. EXECUTION TIME      : AM           10:49

2. EXECUTION RESULT    : NORMAL

3. RESULT DETAILS      : AAA ···
```

FIG. 18

| ITEM NUMBER | IDENTIFICATION INFORMATION | POSITION INFORMATION |
|---|---|---|
| 1 | EX31 | (300,310,200,190) |

FIG. 19

|  | | EX31 UN23 |
|---|---|---|
| 1. EXECUTION TIME | : AM | 10:49 |
| 2. EXECUTION RESULT | : NORMAL | |
| 3. RESULT DETAILS | : AAA ··· | |

FIG. 20

```
                                              EX31
1. EXECUTION TIME      : AM           10:49
2. EXECUTION RESULT    : NORMAL       UN24
3. RESULT DETAILS      : AAA ···
```

FIG. 21

```
                                                    EX32
1. EXECUTION TIME      : AM           10:49

2. EXECUTION RESULT    : NORMAL

3. RESULT DETAILS      : AAA ···
```

FIG. 22

| ITEM NUMBER | IDENTIFICATION INFORMATION | POSITION INFORMATION |
|---|---|---|
| 1 | EX32 | (300,310,200,180) |

FIG. 23

| ITEM NUMBER | IDENTIFICATION INFORMATION | POSITION INFORMATION |
|---|---|---|
| 1 | EX31 | (300,310,200,190) |
| 2 | EX32-2 | (300,310,190,180) |

FIG. 24

```
                                            UN25 EX32
1. EXECUTION TIME    : AM              10:52

2. EXECUTION RESULT  : NORMAL

3. RESULT DETAILS    : AAA ···
```

1. EXECUTION TIME     : AM         10:52

2. EXECUTION RESULT   : NORMAL

3. RESULT DETAILS     : AAA ⋯

FIG. 26

| ITEM NUMBER | IDENTIFICATION INFORMATION | POSITION INFORMATION |
|---|---|---|
| 1 | EX32 | (290,310,200,180) |

FIG. 27

```
                          EX35         EX33
                           ⌇            ⌇
1. EXECUTION TIME       : PM          21:34

2. EXECUTION RESULT     : NORMAL

3. RESULT DETAILS       : AAA  ···
```

FIG. 29

| ITEM NUMBER | REFERENCE CHARACTER TYPE | ADJACENT CHARACTER TYPE |
|---|---|---|
| 1 | NUMERICAL CHARACTER | NUMERICAL CHARACTER |
| 2 | NUMERICAL CHARACTER | : |

COMPARISON PROGRAM, AND COMPARISON DEVICE

CROSS-REFERENCE TO RELATED APPLICATION

This application is based upon and claims the benefit of priority of the prior Japanese Patent Application No. 2017-094580, filed on May 11, 2017, the entire contents of which are incorporated herein by reference.

FIELD

The embodiments discussed herein are related to a comparison program, and a comparison device.

BACKGROUND

For example, a business operator that provides a service to a user (hereinafter, also simply referred to as a business operator) constructs and operates a business system (hereinafter also referred to as information processing system) for providing a service. In a case where the business operator generates a program constituting a business system, the business operator performs various tests on the operation of the generated program.

Specifically, the program generated by the business operator includes, for example, a program for displaying a screen to be viewed by a user who receives the service at the time of execution of the program (hereinafter, also referred to as a screen display program). In a case where the business operator generates the screen display program, the business operator performs a test for confirming that the screen is displayed as expected by the business operator (hereinafter, also referred to as a screen confirmation test), for example.

Examples of the related art include Japanese Laid-open Patent Publication Nos. 2000-276593, 2007-086899, and 2006-191365.

SUMMARY

According to an aspect of the invention, a comparison apparatus includes: a memory configured to store instructions; and a processor configured to execute the instructions stored in the memory, the instructions causing the processor to perform a comparison process including: detecting a different portion between a reference image and a comparison target image by comparing the reference image and the comparison target image; and setting at least one of the different portion and a region in a vicinity of the different portion as a non-target region to be detected as the different portion when compared with the reference image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a diagram illustrating a specific example of a reference image;

FIG. 13 is a diagram illustrating a specific example of a comparison target image;

FIG. 14 is a diagram illustrating the specific example of the reference image;

FIG. 15 is a diagram illustrating the specific example of the comparison target image;

FIG. 16 is a diagram illustrating the specific example of the comparison target image;

FIG. 17 is a diagram illustrating the specific example of the comparison target image;

FIG. 18 is a diagram illustrating a specific example of non-target information;

FIG. 19 is a diagram illustrating the specific example of the comparison target image;

FIG. 20 is a diagram illustrating the specific example of the comparison target image;

FIG. 21 is a diagram illustrating the specific example of the comparison target image;

FIG. 22 is a diagram illustrating the specific example of the non-target information;

FIG. 23 is a diagram illustrating the specific example of the non-target information;

FIG. 24 is a diagram illustrating a specific example of a comparison target image;

FIG. 25 is a diagram illustrating the specific example of the comparison target image;

FIG. 26 is a diagram illustrating the specific example of the non-target information;

FIG. 27 is a diagram illustrating a specific example of a comparison target image;

FIG. 29 is a diagram illustrating a specific example of related information.

DESCRIPTION OF EMBODIMENTS

As described above, a conventional screen confirmation test is performed, for example, by comparing an image corresponding to a screen displayed by a screen display program (hereinafter, also referred to as a comparison target image) with a correct image (hereinafter, also referred to as a reference image) which is prepared in advance by a business operator. For example, the business operator performs a comparison between a comparison target image and a reference image by operating a program for comparing a plurality of images (hereinafter, also referred to as a comparison program). A person in charge who performs the test (hereinafter, also referred to as a person in charge of the test) can determine that processing by the screen display program is normal, for example, in a case where the comparison target image matches the reference image.

Here, for example, the screen by the image display program may contain contents that are updated as desired such as current time. Therefore, even in a case where the processing by the image display program is normal, the comparison target image may not match the reference image.

Therefore, a person in charge who develops the program (hereinafter, also referred to as a person in charge of development) generates (upgrades) a comparison program that does not perform comparison of a predesignated regions among the regions included in the comparison target image and the reference image. Accordingly, it is possible for the business operator to perform the comparison between the comparison target image and the reference image with high accuracy to some extent.

However, the number of screens displayed by the screen display program can be enormous depending on the contents of a service provided to a user. Therefore, in a case where the number of screens to be confirmed is enormous, it is desire to incorporate processing corresponding to each of the enormous number of screens into the comparison program, and a burden desired to generate (upgrade) the comparison program increases. Depending on the degree of enormousness of the number of screens, not only the burden of generation (upgrade) of the comparison program but also limitation of a memory capacity due to hardware of a computer for executing the comparison program and limitation of an execution time, it may be difficult to execute the program.

According to one aspect of the present disclosure, provided are technologies for efficiently enabling of performing a test for confirming the displayed screen.

<Configuration of Information Processing System>

Figure 1:
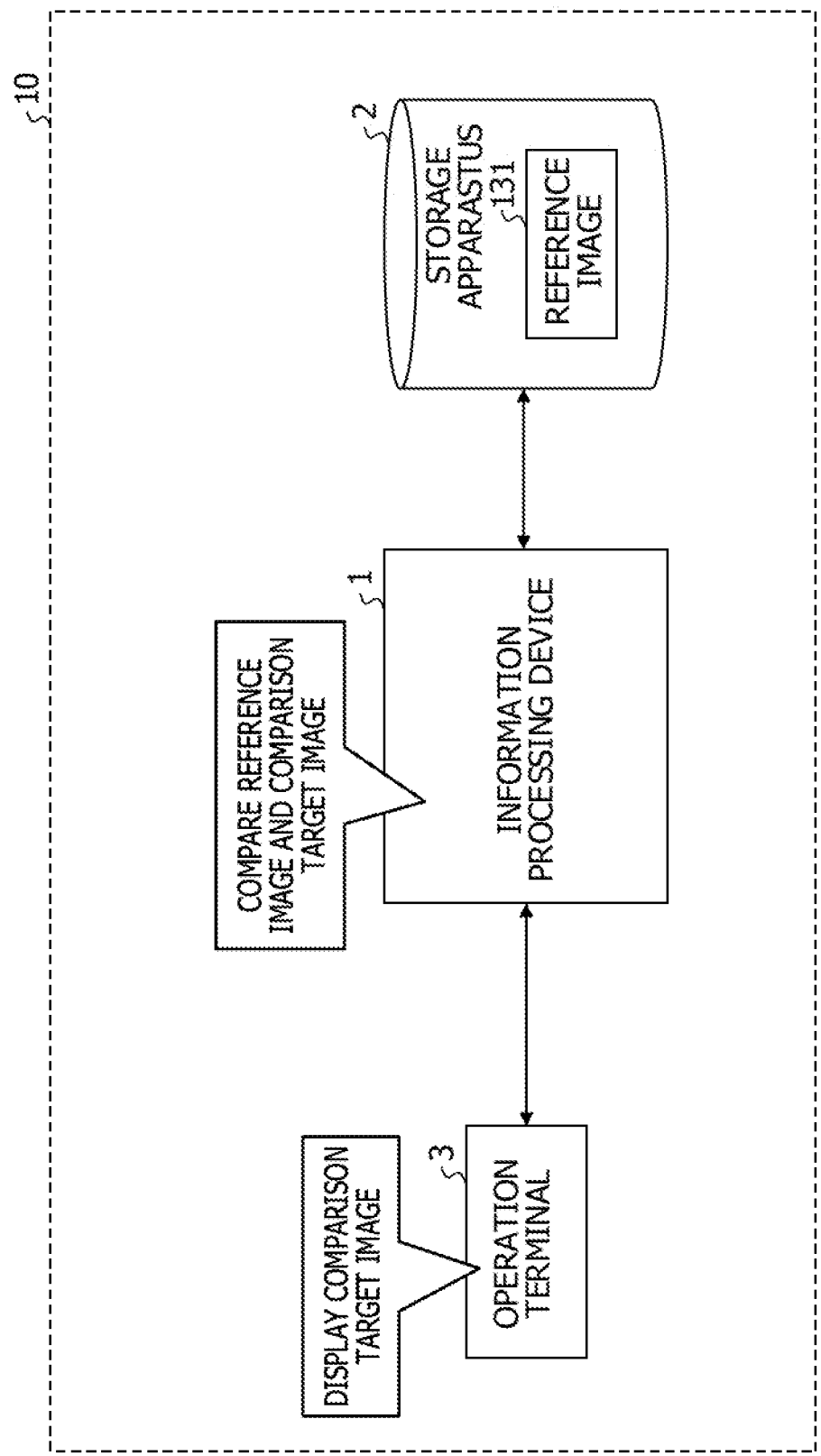
FIG. 1 is a diagram illustrating an overall configuration of an information processing system.

FIG. 1 is a diagram illustrating an overall configuration of an information processing system 10. The information processing system 10 illustrated in FIG. 1 includes an information processing device 1, a storage device 2, and an operation terminal 3.

The information processing device 1 (a CPU of the information processing device 1) executes, for example, a screen display program for displaying a screen to be viewed by a user who receives a service. Specifically, the information processing device 1 executes the screen display program according to the reception of an execution instruction of the screen display program from the operation terminal 3, for example. In accordance with the execution of the screen display program, the information processing device 1 displays a screen on a display device (not illustrated) of the operation terminal 3 that transmitted the execution instruction, for example, as illustrated in FIG. 1.

Thereafter, the information processing device 1 (the CPU of the information processing device 1) compares a comparison target image 132 displayed on a display device of the operation terminal 3 and a reference image 131 stored in the storage device 2, for example.

Accordingly, the person in charge of the test can perform the screen confirmation test via the display device of the operation terminal 3, for example.

Here, for example, the screen by the image display program may contain contents that are updated as appropriate such as current time. Therefore, even in a case where the processing by the image display program is normal, the comparison target image 132 may not match the reference image 131.

Therefore, the person in charge of development generates (upgrades) the comparative program that does not compare the designated regions out of the regions included in the comparison target image 132 and the reference image 131, for example. Accordingly, the business operator can accurately compare the comparison target image 132 and the reference image 131.

However, the number of screens displayed by the screen display program may be enormous depending on the contents of the service provided to the user. Therefore, in this case, the person in charge of development desires to incorporate processing corresponding to each of the enormous number of screens into the comparison program, and the burden desired for generation (upgrade) of the comparison program increases.

Therefore, when the information processing device 1 according to the present embodiment compares the reference image 131 with the comparison target image 132 to detect a different portion, the information processing device 1 sets the detected different portion or a region in a vicinity of the different portion as a non-target region to be detected as the different portion when compared with the reference image 131.

That is, for example, in a case where the different portion exists between the reference image 131 and the comparison target image 132, the information processing device 1 according to the present embodiment set a region including the different portion as the non-target region in a case of comparing with a new comparison target image 132 (hereinafter, simply referred to as non-target region). Specifically, for example, in a case where designating that the different portion between the reference image 131 and the comparison target image 132 be the non-target region is received, the information processing device 1 sets the different portion as the non-target region.

Accordingly, the information processing device 1 can automatically expand the non-target region each time when the comparison between the reference image 131 and the comparison target image 132 is performed. Therefore, the information processing device 1 can improve the comparison accuracy between the reference image 131 and the comparison target image 132. Accordingly, the information processing device 1 can efficiently perform the screen confirmation test.

<Hardware Configuration of Information Processing Device>

Figure 2:
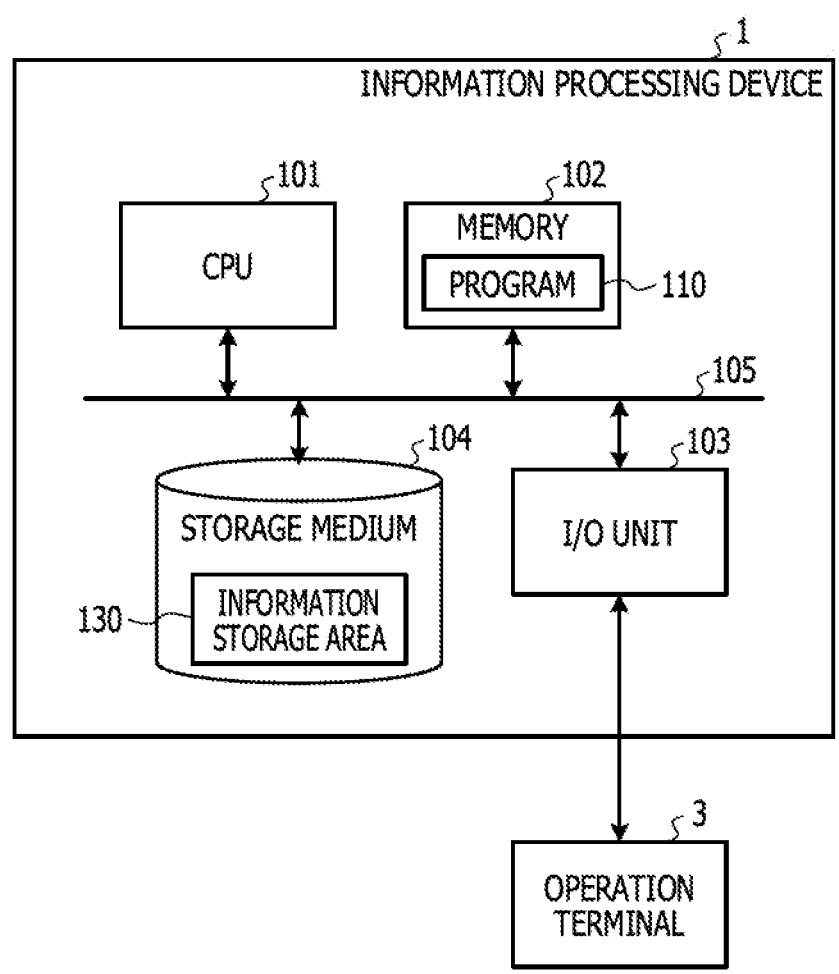
FIG. 2 is a diagram illustrating a hardware configuration of an information processing device.

Next, a hardware configuration of the information processing device 1 will be described. FIG. 2 is a diagram illustrating a hardware configuration of the information processing device 1.

As illustrated in FIG. 2, the information processing device 1 includes a CPU 101 that is a processor, a memory 102, an external interface (I/O unit) 103, and a storage medium (storage) 104. The respective units are connected to each other via a bus 105.

The storage medium 104 stores, for example, a comparison program 110 (hereinafter, also referred to as a program 110) in a program storage area (not illustrated) in the storage medium 104.

As illustrated in FIG. 2, the CPU 101 loads the program 110 from the storage medium 104 into the memory 102 at the time of execution of the program 110, performs processing of comparing the displayed images by cooperating with the program 110 (hereinafter, simply referred to as comparison processing).

The storage medium 104 is, for example, a hard disk drive (HDD), a solid state drive (SSD), or the like, and includes an information storage area 130 that stores information used for performing comparison processing (hereinafter, also referred to as a storage area 130). The storage device 2 illustrated in FIG. 1 may correspond to the information storage area 130, for example.

In addition, the external interface 103 communicates with the operation terminal 3 via a network.

<Software Configuration of Information Processing Device>

Figure 3:
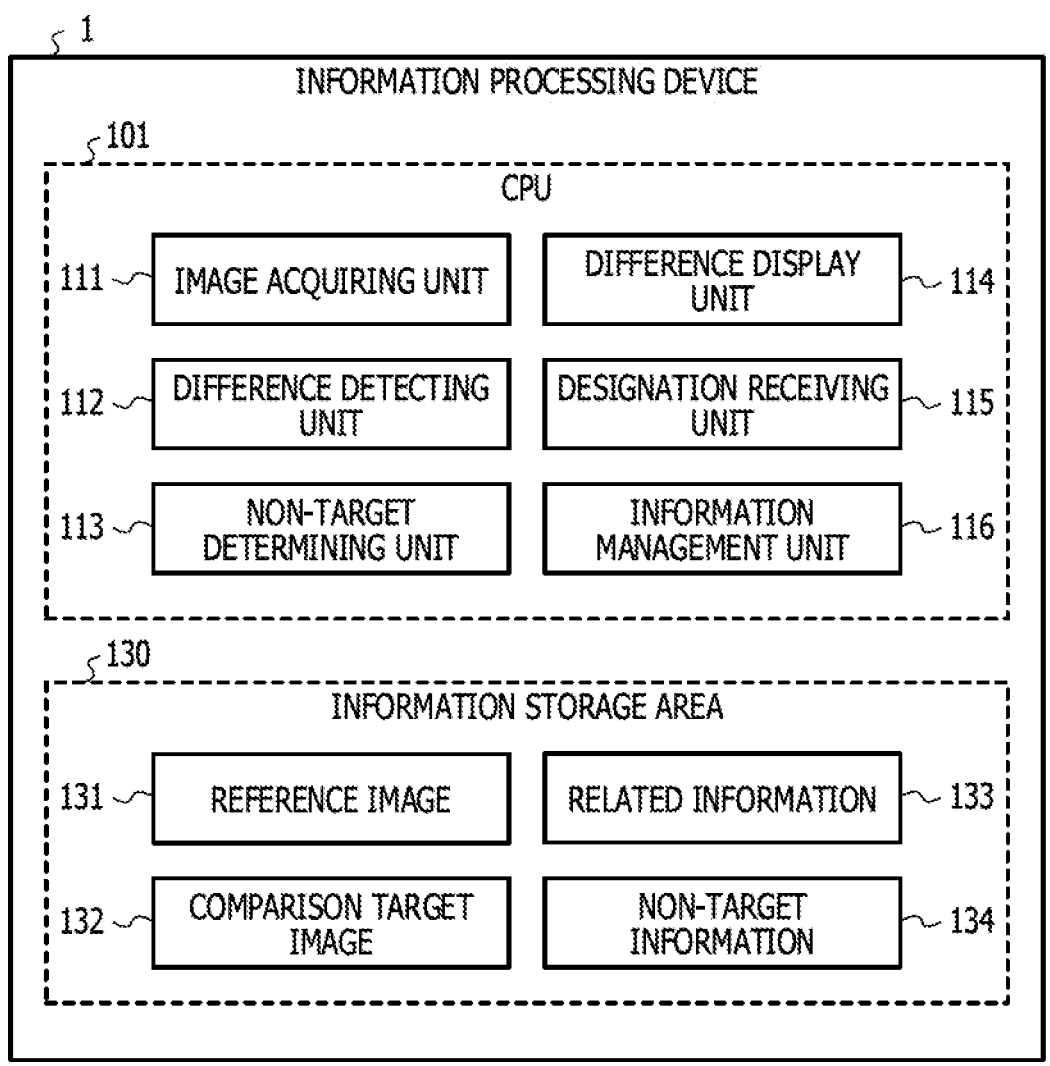
FIG. 3 is a block diagram of a function of the information processing device.

Next, a software configuration of the information processing device 1 will be described. FIG. 3 is a block diagram of a function of the information processing device 1.

As illustrated in 3, by cooperating with the program 110, the CPU 101 is operated as an image acquiring unit 111, a difference detecting unit 112, a non-target determining unit 113, a difference display unit 114, a designation receiving unit 115, and an information management unit 116.

In the information storage area 130, as illustrated in FIG. 3, the reference image 131, the comparison target image 132, related information 133, and non-target information 134 are stored.

For example, the image acquiring unit 111 acquires an image corresponding to the screen displayed on the display device of the operation terminal 3 as the comparison target image 132. The image acquiring unit 111 acquires the reference image 131 to be compared with the acquired comparison target image 132 in the reference images 131 stored in the information storage area 130. The reference image 131 is, for example, an image corresponding to the past screen displayed on the display device of the operation terminal 3, and may be stored in the information storage area 130 in advance. In addition, for example, the image acquiring unit 111 may store the acquired comparison target image 132 in the information storage area 130.

The difference detecting unit 112 compares the reference image 131 acquired by the image acquiring unit 111 with the comparison target image 132. The difference detecting unit 112 detects a different portion existing between the reference image 131 and the comparison target image 132 (hereinafter, also referred to as a different region).

The non-target determining unit 113 determines whether information indicating a different region detected by the difference detecting unit 112 is included in the non-target information 134 stored in the information storage area 130. The non-target information 134 is information indicating the non-target region in the case of comparing the reference image 131 and the comparison target image 132.

For example, the difference display unit 114 displays information indicating the different region detected by the difference detecting unit 112 or a region in a vicinity of the different region with respect to the display device of the operation terminal 3. Specifically, for example, in a case where it is determined that the information indicating the different region detected by the difference detecting unit 112 is not included in the non-target information 134 stored in the information storage area 130, the difference display unit 114 displays the information indicating the different region or a region in the vicinity of the different region on the display device of the operation terminal 3.

The region in the vicinity of the different region is, for example, a region related to a different region detected by the difference detecting unit 112. Specifically, the region in the vicinity of the different region may be, for example, a region in which the information that relates to the detected different region is included in the related information 133. The related information 133 is information generated in advance by the business operator and stored in the information storage area 130, and is information indicating the regions that are mutually related among the regions included in the reference image 131 and the comparison target image 132.

The designation receiving unit 115 receives the designation whether to set the different portion detected by the difference detecting unit 112 or the region in the vicinity of the different portion (corresponding to the information displayed by the difference display unit 114) as the non-target region in a case where the reference image 131 is compared with the comparison target image 132. Specifically, for example, the designation receiving unit 115 receives the designation performed by the business operator via the operation terminal 3.

For example, in the case where the designation that the different portion detected by the difference detecting unit 112 or the region in the vicinity of the different portion is set as the non-target region is received, the designation receiving unit 115 sets the detected different portion or the region in the vicinity of the different portion as the non-target region. Specifically, in this case, for example, the information management unit 116 stores information indicating that the detected different portion or the region in the vicinity of the different portion in the information storage area 130 as a part of the non-target information 134.

For example, in a case where the difference detecting unit 112 detects a different region, the information management unit 116 may set the detected different portion or the portion in the vicinity of the different portion as the non-target region.

<Outline of First Embodiment>

Figure 4:
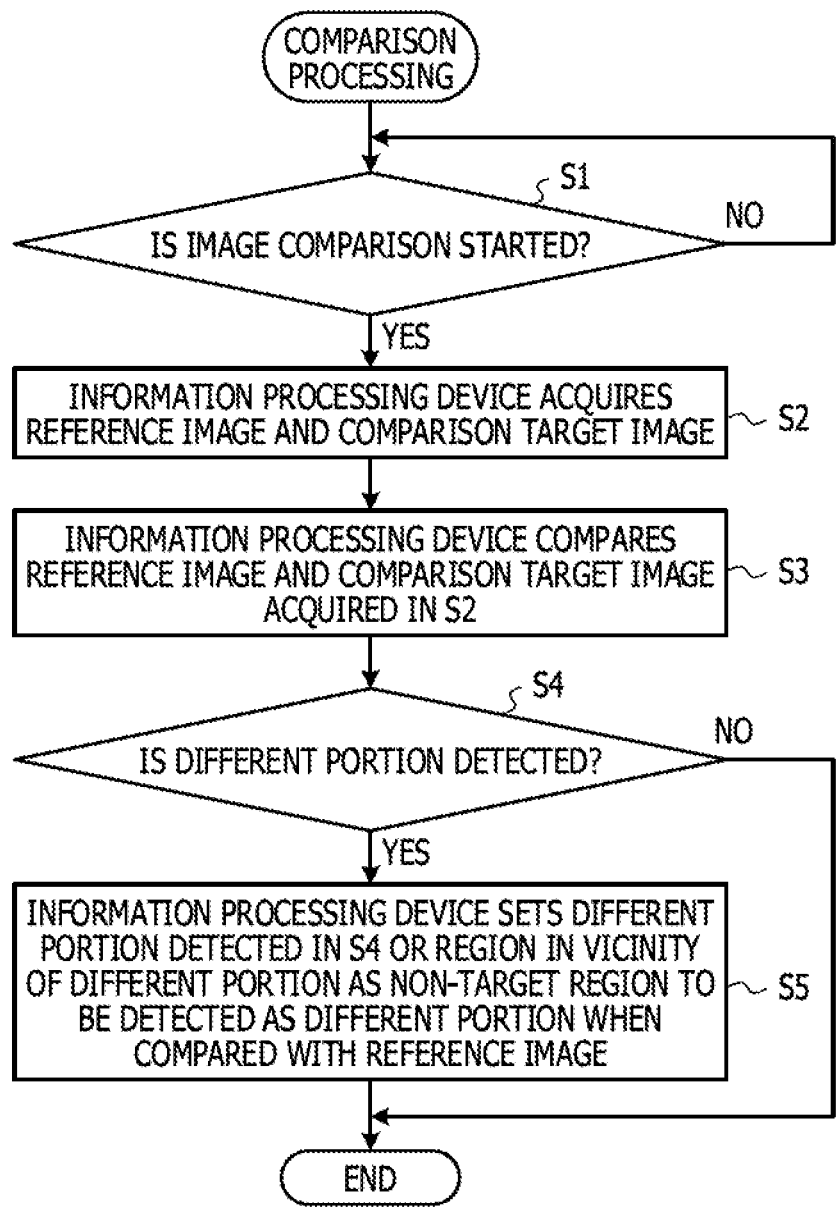
FIG. 4 is a flowchart illustrating an outline of comparison processing in a first embodiment.
Figure 5:
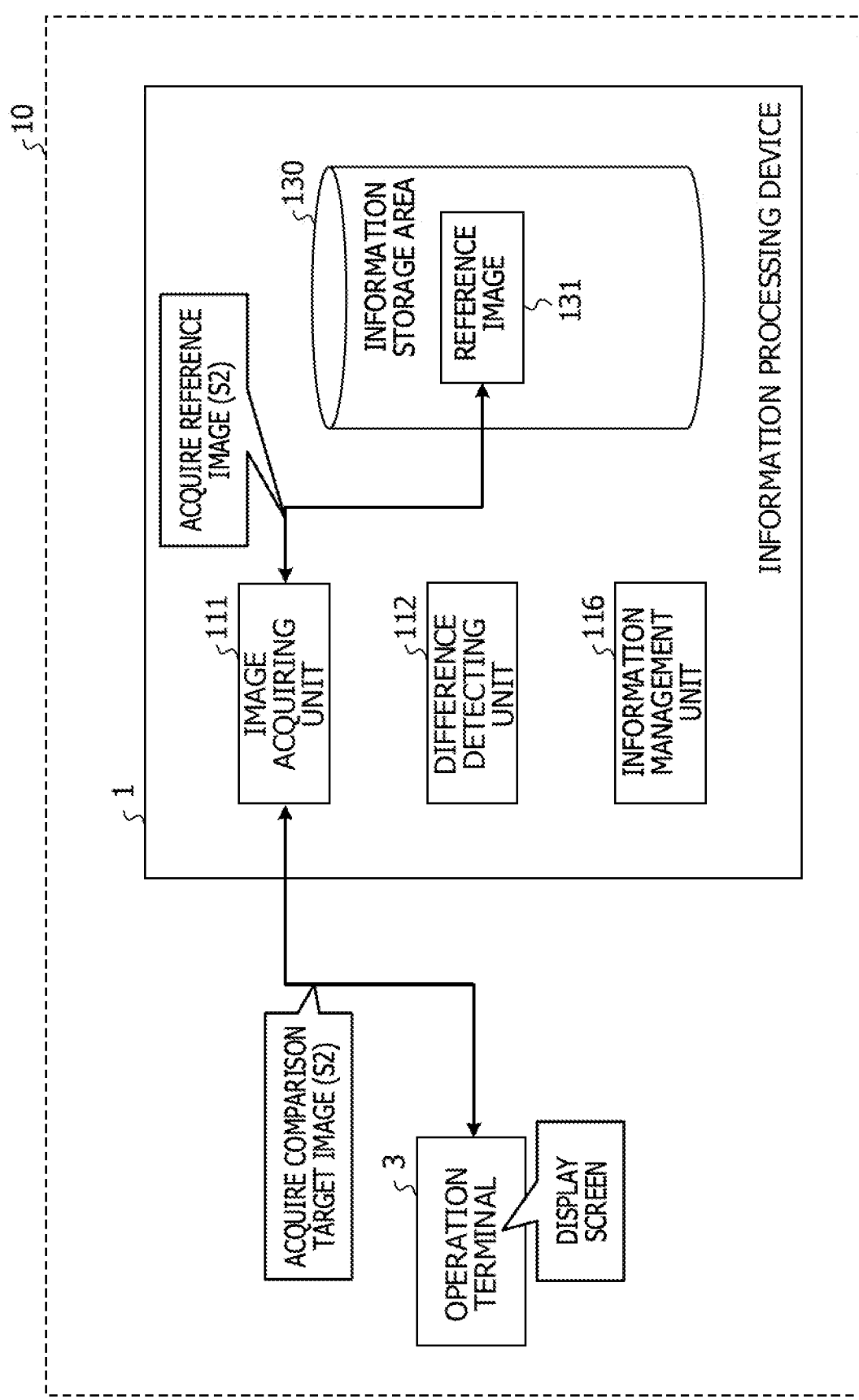
FIG. 5 is a diagram illustrating the outline of the comparison processing in the first embodiment.
Figure 6:
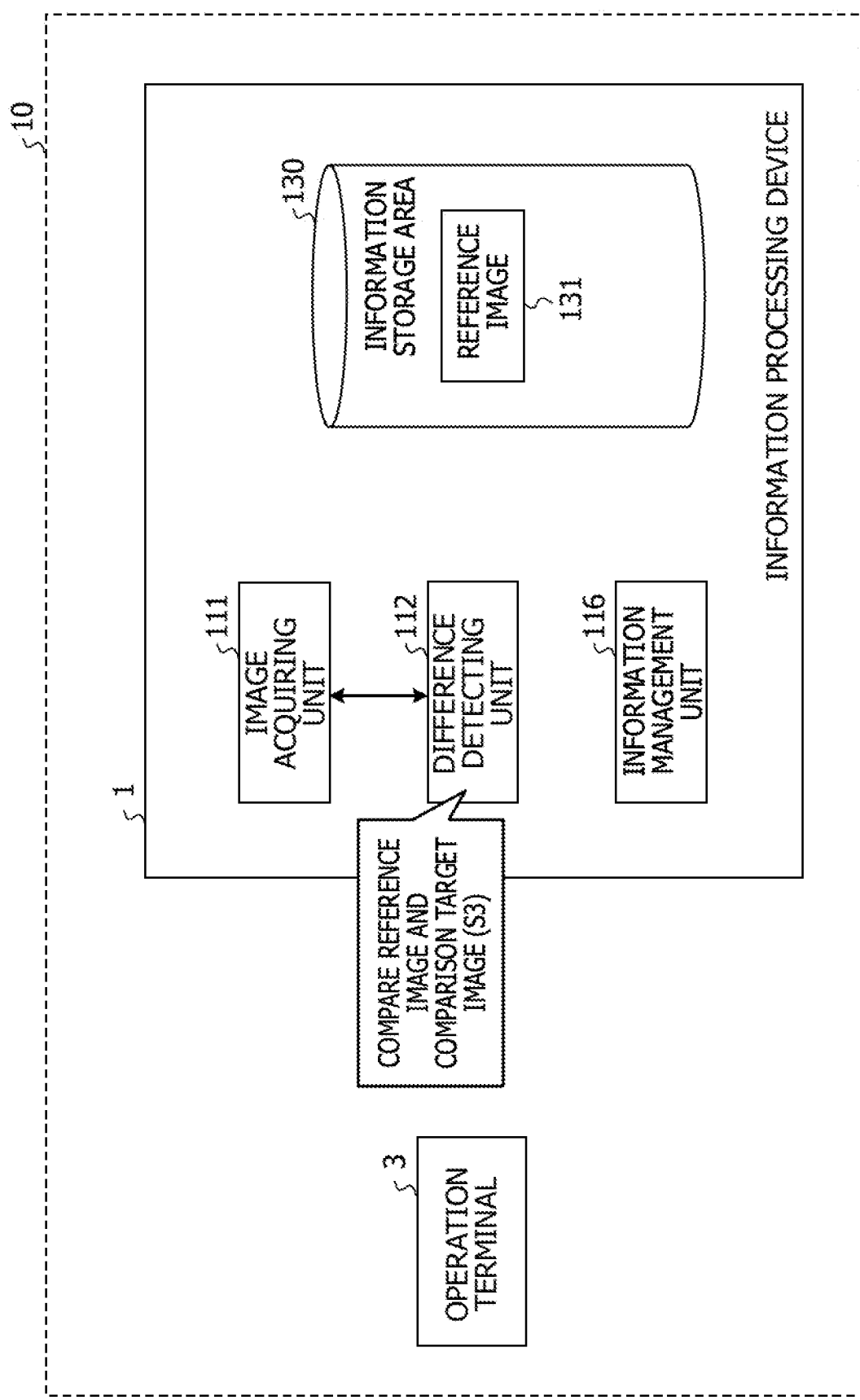
FIG. 6 is a diagram illustrating the outline of the comparison processing of the first embodiment.
Figure 7:
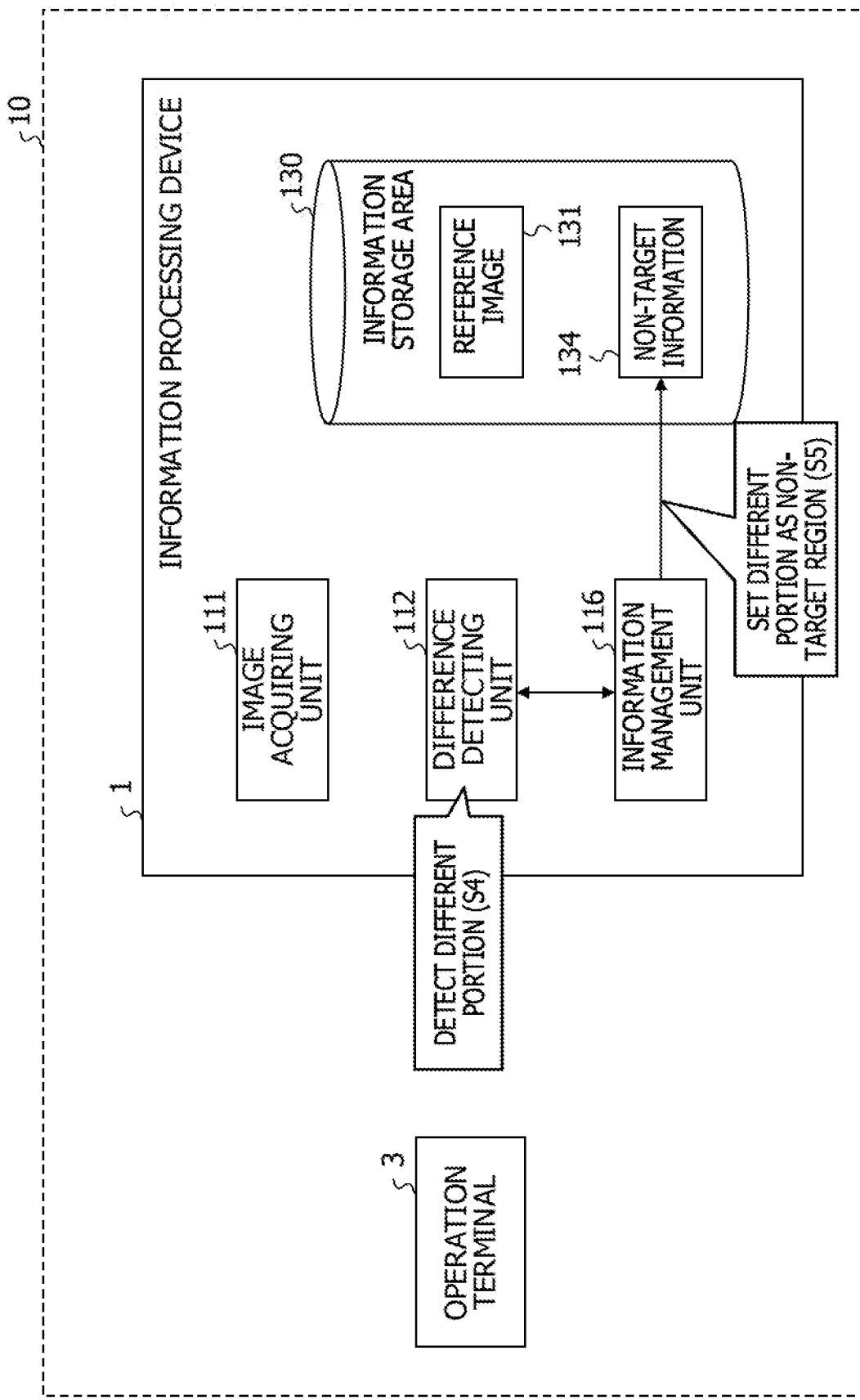
FIG. 7 is a diagram illustrating the outline of the comparison processing of the first embodiment.

Next, the outline of a first embodiment will be described. FIG. 4 is a flowchart illustrating an outline of comparison processing in the first embodiment. FIGS. 5 to 7 are diagrams illustrating the outline of the comparison processing in the first embodiment. The outline of the comparison processing in FIG. 4 will be described with reference to FIGS. 5 to 7.

As illustrated in FIG. 4, the image acquiring unit 111 of the information processing device 1 stands by until the comparison between the reference image 131 and the comparison target image 132 is started (NO in S1). Specifically, for example, the image acquiring unit 111 stands until the business operator inputs that the comparison between the reference image 131 and the comparison target image 132 is performed via the operation terminal 3.

In a case where the comparison between the reference image 131 and the comparison target image 132 is started (YES in S1), the image acquiring unit 111 acquires the reference image 131 and the comparison target image 132 (S2). Specifically, as illustrated in FIG. 5, the image acquiring unit 111 acquires, for example, a screen corresponding to the screen displayed on the display device of the operation terminal 3 as the comparison target image 132. In addition, as illustrated in FIG. 5, the image acquiring unit 111 acquires the reference image 131 to be compared with the comparison target image 132 acquired from the reference image 131 stored in the information storage area 130.

Subsequently, as illustrated in FIG. 6, the difference detecting unit 112 of the information processing device 1 compares the reference image 131 acquired in the processing of S2 with the comparison target image 132 (S3).

In a case where the difference detecting unit 112 detects a different portion (YES in S4), the information management unit 116 of the image processing device 1 sets the different portion detected in the processing of S4 or the region in the vicinity of the different portion as the non-target region to be detected as the different portion when compared with the reference image 131 (S5). Specifically, in this case, as illustrated in FIG. 7, the information management unit 116 stores information indicating that the different region detected in the processing of S4 or the region in the vicinity of the different portion as the non-target region in the information storage area 130 as at least part of the non-target information 134.

That is, for example, in a case where the different portion exists between the reference image 131 and the comparison target image 132, the information processing device 1 according to the present embodiment set a region including the different portion as the non-target region in a case of comparing with a new comparison target image 132. Specifically, for example, in a case where designating that the different portion between the reference image 131 and the comparison target image 132 be the non-target region is received, the information processing device 1 sets the different portion as the non-target region.

Accordingly, the information processing device 1 can automatically expand the non-target region each time when the comparison between the reference image 131 and the comparison target image 132 is performed. Therefore, the information processing device 1 can improve the comparison accuracy between the reference image 131 and the comparison target image 132. Accordingly, the information processing device 1 can efficiently perform the screen confirmation test.

<Details of First Embodiment>

Next, the details of the first embodiment will be described. FIGS. 8 to 11 are flowcharts illustrating details of the comparison processing in the first embodiment. In addition, FIGS. 12 to 27 are diagrams illustrating the details of the comparison processing in the first embodiment. The details of the comparison processing illustrated in FIGS. 8 to 11 will be described with reference to FIGS. 12 to 27.

Figure 8:
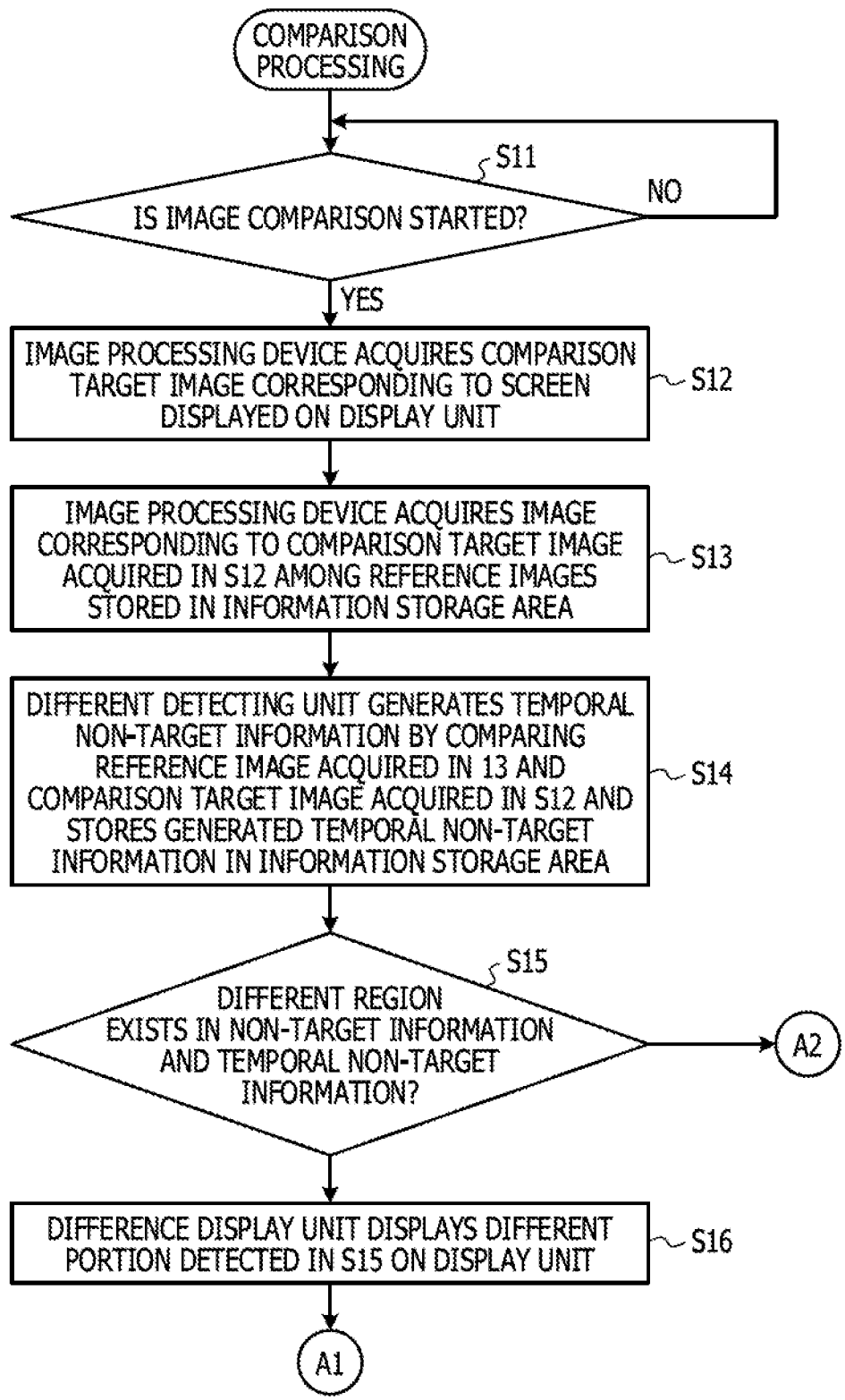
FIG. 8 is a flowchart illustrating details of the comparison processing of the first embodiment.

As illustrated in FIG. 8, the image acquiring unit 111 stands by until the comparison between the reference image 131 and the comparison target image 132 is started (NO in S11). In a case where the comparison between the reference image 131 and the comparison target image 132 is started (YES in S11), the image acquiring unit 111 acquires the screen corresponding to the screen displayed on the display device of the operation terminal 3 as an image 132 as the comparison target image 132 (S12). In addition, the image acquiring unit 111 acquires the reference image 131 for comparing with the comparison target image 132 acquired in the processing of S12 in the reference image 131 stored in the information storage area 130 (S13).

Next, the difference detecting unit 112 compares the reference image 131 acquired in the processing of S13 with the comparison target image 132 acquired in the processing of S12 to generate temporal non-target information 134 (hereinafter, also referred to as temporary non-target information 134a), and stores the generated temporary non-target information 134a in the information storage area 130 (S14). The temporary non-target information 134a is the non-target information 134 before receiving the designation to store in the information storage area 130 as the non-target information 134. Hereinafter, the specific examples of the reference image 131 and the comparison target image 132 will be described.

<Specific Example of Reference Image>

First, a specific example of the reference image 131 will be described. FIGS. 12 and 14 are diagrams illustrating the specific example of the reference image 131.

The reference image 131 illustrated in FIG. 12 and the like includes information of "1. execution time: 10:47 AM", information "2. execution result: normal", and information "3. result details: AAA . . . ". Specifically, "AM" and "10:47" among the information included in the reference image 131 illustrated in FIG. 12 are information items updated in accordance with the time when the reference image 131 is acquired.

<Specific Example of Comparison Image>

Next, a specific example of a comparison target image 132a that is one of the comparison target images 132 will be described. FIGS. 13, 15, 16, 17, 19, 20, and 21 are diagrams illustrating a specific example of the comparison target image 132a. Hereinafter, it is described that it is assumed that the comparison target image 132a illustrated in FIG. 13 and the like is an image acquired from the same screen as the reference image 131 illustrated in FIG. 12.

The comparison target image 132a illustrated in FIG. 13 includes information of "1. execution time: 10:49 AM", information "2. execution result: normal", and information "3. result details: MA . . . ".

That is, the reference image 131 illustrated in FIG. 12 and the comparison target image 132a illustrated in FIG. 13 are the images acquired from the same screen. However, the information items indicating the time are different according to the acquired time, respectively. Therefore, even in a case where there is no abnormality in the processing (processing by the screen display program) for displaying the screen corresponding to the comparison target image 132, the comparison target image 132 acquired by the image acquiring unit 111 does not match the reference image 131 acquired by the image acquiring unit 111.

In the information processing device 1 according to the present embodiment, in a case where of detecting the above-described different region, for example, the detected region is managed as the audio signal on the condition that approval by the business operator is established. Accordingly, in a case of comparing the reference image 131 with the comparison target image 132 (the newly acquired comparison target image 132) again, the information processing device 1 may reduce a probability that the determination that each image does not match is performed again due to the existence of the different detected region. Therefore, the information processing device 1 can improve the comparison accuracy between the reference image 131 and the comparison target image 132. Hereinafter, the details of the processing of S14 will be described.

<Details of Processing of S14>

Figure 10:
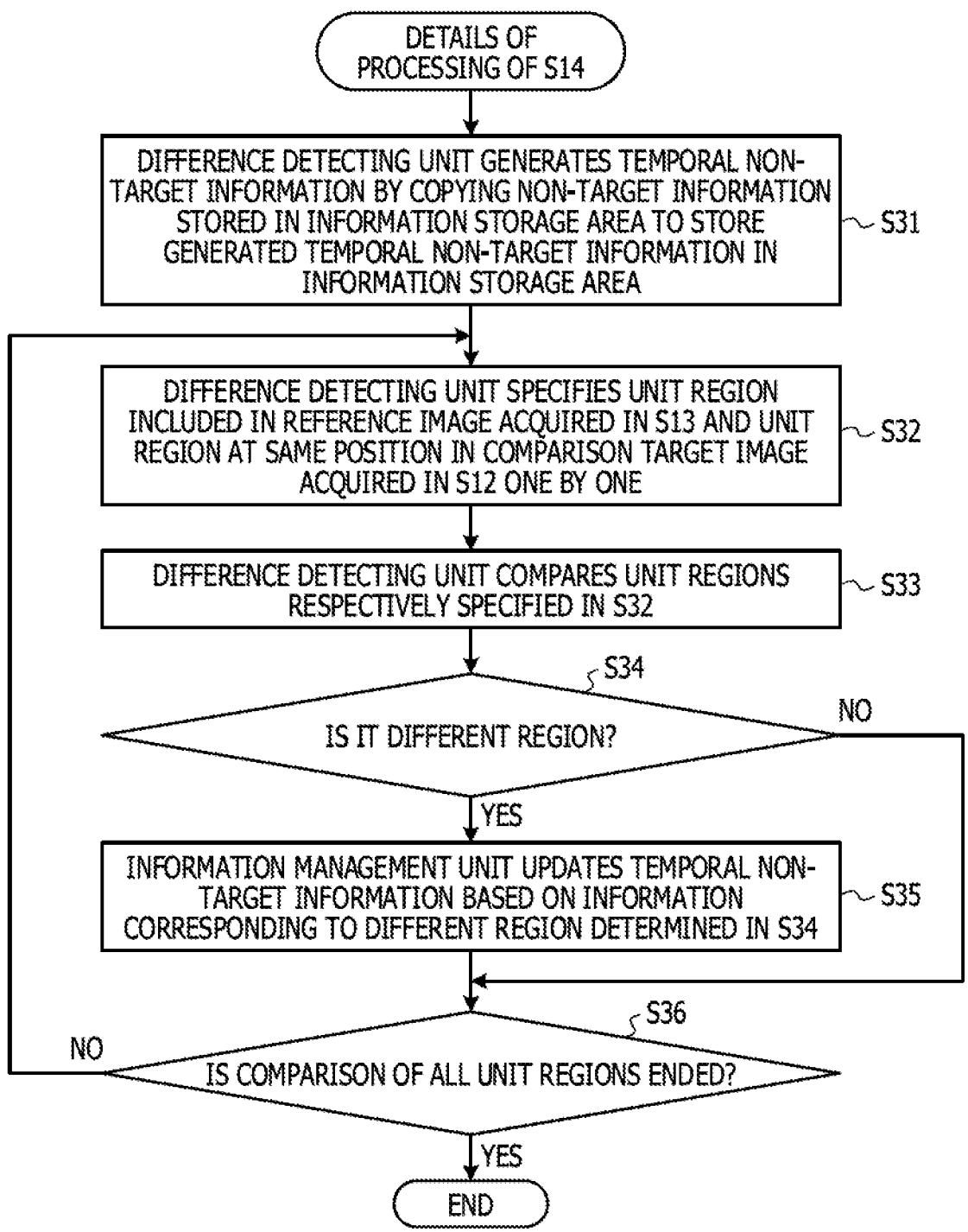
FIG. 10 is a flowchart illustrating the details of the comparison processing of the first embodiment.

FIG. 10 is a diagram illustrating the details of the processing of S14.

The difference detecting unit 112 copies the non-target information 134 stored in the information storage area 130. Accordingly, the temporary non-target information 134a is generated and stores the temporary non-target information 134a in the information storage area 130 (S31).

For example, the difference detecting unit 112 specifies the unit region at the same location one by one in the unit region included in the reference image 131 acquired in the processing of S13 and the unit region included in the comparison target image 132 acquired in the processing of S12 (S32). Thereafter, the difference detecting unit 112 compares the unit regions respectively specified in the processing of S32 (S33). That is, the difference detecting unit 112 sequentially compares the reference image 131 and the comparison target image 132 for each unit region.

Specifically, as illustrated in FIG. 14, the difference detecting unit 112 specifies a unit region UN11 included in the reference image 131. In addition, as illustrated in FIG. 15, the difference detecting unit 112 specifies a unit region UN21 at the same position as the unit area UN11 illustrated in FIG. 14 among the unit regions included in the comparison target image 132. The difference detecting unit 112 compares the specified unit regions UN11 with the unit area UN21.

As a result, in a case where it is determined that the unit regions specified in S32 are not different regions (NO in S34), the information management unit 116 determines whether the comparison of all the unit regions included in the reference image 131 and the comparison target image 132 with each other is ended (S36).

In a case where it is determined that the comparison of all the unit regions is ended (NO in S36), the difference detecting unit 112 performs the processing after S32 again. In addition, in a case where it is determined that the comparison of all the unit regions is ended (YES in S36), the information processing device 1 ends the processing of S14.

On the other hand, in a case where it is determined that the unit regions specified in the processing of S32 are different regions (YES in S34), the information management unit 116 updates the temporary non-target information 134a stored in the information storage area 130 based on the information corresponding to the different region detected in the processing of S15 (S35). Hereinafter, the details of the processing of S35 will be described.

<Detailed Processing of S35>

Figure 11:
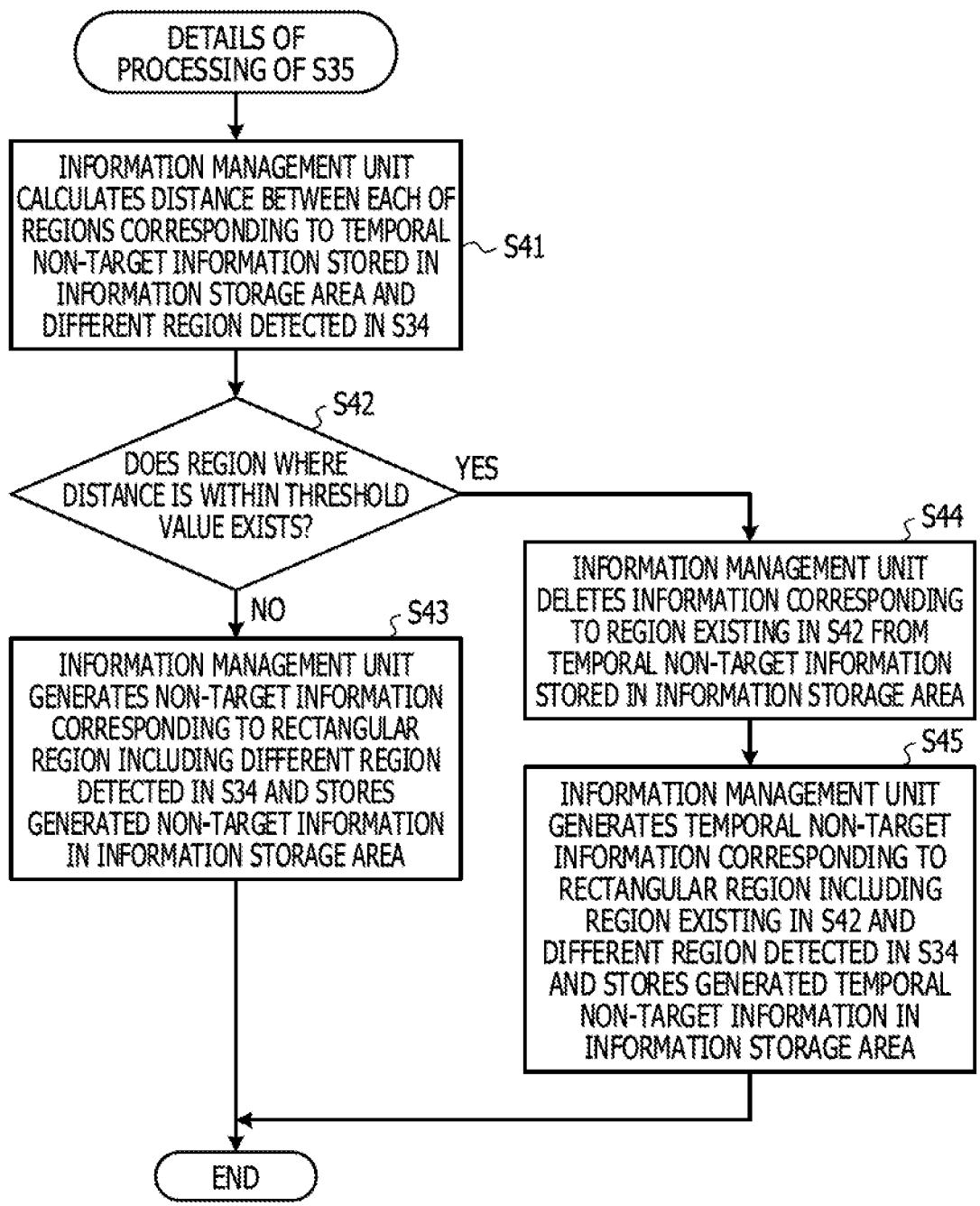
FIG. 11 is a flowchart illustrating the details of the comparison processing of the first embodiment.

FIG. 11 is a diagram illustrating the details of the processing in S35.

The information management unit 116 calculates a distance between each of the regions corresponding to the temporary non-target information 134a stored in the information storage area 130 and the different region detected in the processing of S34 (S41).

Then, in a case where there is a region where the distance to the different region detected in the processing of S34 is within a predetermined threshold value (YES in S42), the information management unit 116 deletes the information corresponding to the existing region in the information storage area 130 from the temporary non-target information 134a stored in the storage unit (S44).

Furthermore, in this case, the information management unit 116 generates new temporary non-target information 134a corresponding to a rectangular region including the area existing in the processing of S42 and the different region detected in the processing of S34, and stores the temporary non-target information 134a in the information storage area 130 (S45).

That is, in the processing of S42, in a case where the information management unit 116 determines that there is a region where the distance to the different region detected in the processing of S34 is within the predetermined threshold, the information management unit 116 expands the temporary non-target information 134a corresponding to the existing area so as to include different regions detected in the processing of S34.

On the other hand, in a case where there is no region where distance to the different region detected in the processing of S34 is within the predetermined threshold value (NO in S42), the information management unit 116 determines whether the rectangular area including the different region detected in S34, and stores the generated new temporary non-target information 134a in the information storage area 130 (S43).

That is, in this case, the information management unit 116 determines that the temporary non-target information 134a to be extended does not exist in the information storage area 130, and new temporary non-target information 134a including only the different regions detected in the processing of S34 is newly included.

Returning to FIG. 10, the information management unit 116 determines whether the comparison has been made for all the unit regions included in the reference image 131 acquired in the processing of S12 and the comparison target image 132 acquired in the processing of S13 (S36).

As a result, in a case where it is determined that the comparison of all the unit regions is not ended (NO in S36), the difference detecting unit 112 performs the processing after processing of S32 again. On the other hand, in a case where it is determined that the comparison of all the unit regions is ended (YES in S36), the information processing device 1 ends the processing of S14.

Returning to FIG. 8, it is determined whether the different region between the temporary non-target information 134a (the temporary non-target information 134a generated in the processing of S14) stored in the information storage area 130 and the non-target information 134 stored in the information storage area 130 is existence (S15).

As a result, in a case where it is determined that there is the different region (YES in S15), the difference display unit 114 displays, for example, the different region detected in the processing of S15 on the display device of the operation terminal 3 (S17). That is, in this case, the difference display unit 114 causes the business operator to determine whether to store the temporary non-target information 134a generated in the processing of S14 as the non-target information 134 in the information storage area 130.

Figure 9:
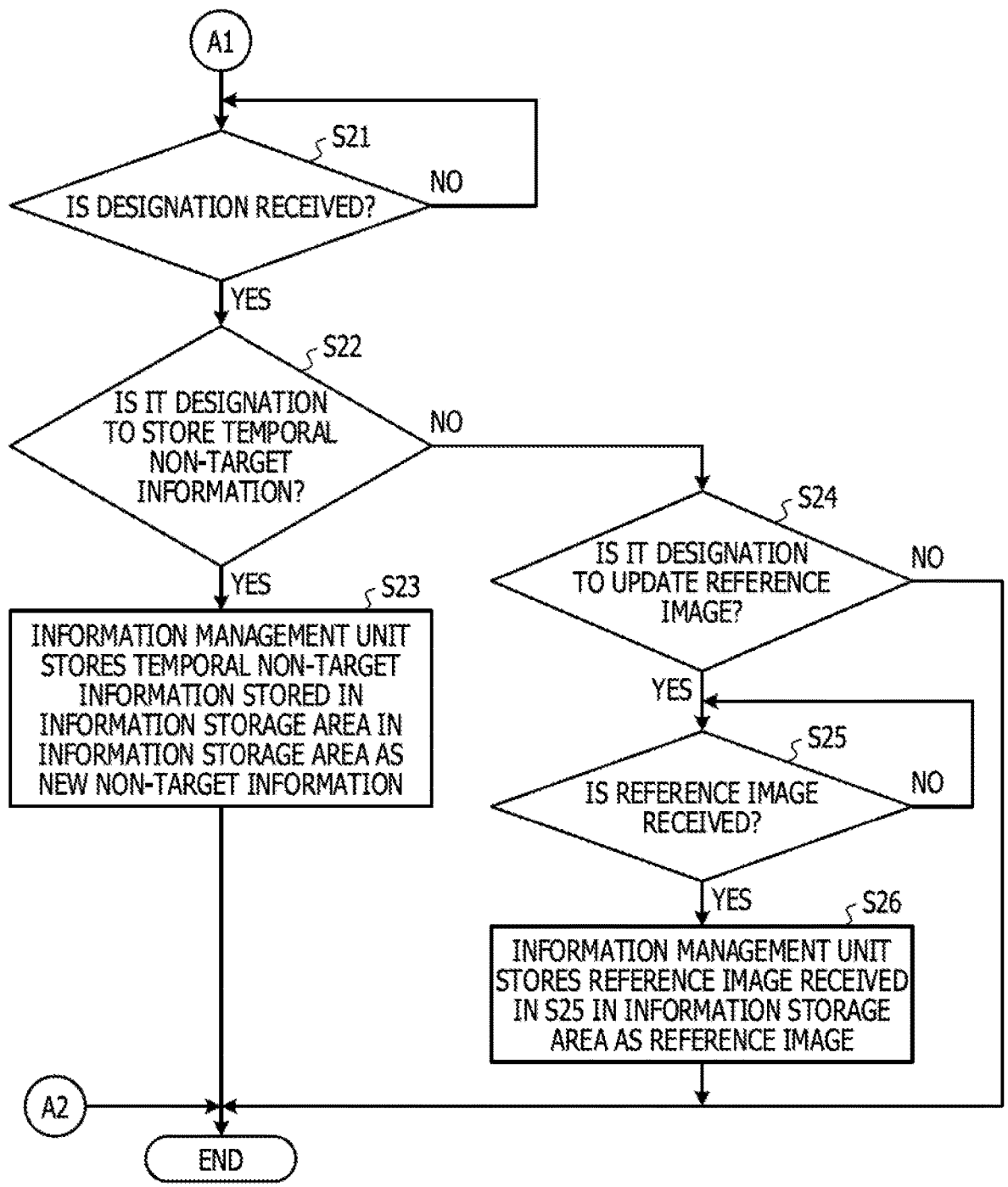
FIG. 9 is a flowchart illustrating the details of the comparison processing of the first embodiment.

Thereafter, as illustrated in FIG. 9, the information management unit 116 of the information processing device 1 stands by until it receives the designation or the like to store the temporary non-target information 134a generated in the processing of S14 as the information storage area 130 (NO in S21). Specifically, for example, the information management unit 116 stands by until the business operator performs inputting of the designation via the operation terminal 3.

Then, in a case where the designation to store the temporary non-target information 134a generated in the processing of S14 as the non-target information 134 in the information storage area 130 is received (YES in S21 and YES in S22), the information management unit 116 stores the temporary non-target information 134a stored in the storage area 130 in the information storage area 130 as a new non-target information 134 (S23).

On the other hand, in a case where the designation to update the reference image 131 obtained in the processing of S13 is received (YES in S21, NO in S22, and YES in S24), the information management unit 116 stands by until the reference image 131 is received (NO in S24).

In other words, the business operator may determine that the reason why there is the different region between the non-target information 134 and the temporary non-target information 134a is that the content of the reference image 131 is not appropriate. Therefore, in this case, the business operator designates to update the reference image 131 via the operation terminal 3 instead of designating to store the temporary non-target information 134a as the non-target information 134 in the information storage area 130, and transmits a new reference image 131 to the information processing device 1.

In a case where the reference image 131 is received (YES in S25), the information management unit 116 stores the received reference image 131 as a new reference image 131 in the information storage area 130 (S26).

On the other hand, in a case where the designation is not received before the predetermined time elapses in the processing of S22 (NO in S22 and NO in S24), the information management unit 116 does not perform the processing in S25.

Here, a case where the designation to store the temporary non-target information 134a as the non-target information 134 in the information storage area 130 is not accepted means a case where that the business operator is determined that the temporary non-target information 134a is not stored in the information storage area 130 as the non-target information 134. Therefore, in this case, the information management unit 116 does not perform the processing of S23.

In a case where the processing of S23 or S26 is performed, the information processing device 1 ends the comparison processing. In addition, in the processing of S15, the information processing device 1, similarly, and a case where there it is determined that there is no different region between the non-target information 134 and the temporary non-target information 134a similarly ends the comparison processing (NO in S15). Hereinafter, the specific examples of the processing from S32 to S36 will be described.

Specific Examples (1) of Processing from S31 to S36

FIGS. 16 to 27 are diagrams illustrating a specific example of the comparison processing. Hereinafter, a case where the comparison target image 132 acquired in the processing of S12 is the comparison target image 132a illustrated in FIG. 13, and the reference image 131 acquired in the processing of S13 is the reference image 131 illustrated in FIG. 12 will be described. In addition, a case where at the start of comparison between the unit area included in the reference image 131 illustrated in FIG. 12 and the unit area included in the comparison target image 132a illustrated in FIG. 13, the non-target information 134 is stored in the information storage area 130 will be described.

For example, the difference detecting unit 112 firstly specifies the unit area UN11 illustrated in FIG. 14 and the unit area UN21 illustrated in FIG. 15 (S32). Since the unit area UN11 and the unit area UN21 are blank regions, the difference detecting unit 112 determines that the unit area UN11 and the unit area UN21 match (NO in S33 and S34 and NO in S36).

Subsequently, as illustrated in FIG. 16, for example, in a case where the comparison of a unit area UN22 included in the comparison target image 132a is performed, the difference detecting unit 112 determines that the unit region UN22 and a unit region (not illustrated) corresponding to the unit region UN22 among the unit regions included in the reference image 131 illustrated in FIG. 12 or the like are the different regions (YES in S32, S33, and S34). Therefore, as illustrated in FIG. 17, the information management unit 116 manages the unit area UN22 as a non-target region EX31. Specifically, the information management unit 116 generates the temporary non-target information 134a indicating that the unit area UN22 is the non-target region EX31, and stores the generated temporary non-target information 134a in the information storage area 130. A specific example of the temporary non-target information 134a will be described below.

<Specific Example of Temporary Non-target Information>

FIGS. 18, 22, 23, and 26 are diagrams illustrating a specific example of the temporary non-target information 134a.

The temporary non-target information 134a illustrated in FIG. 18 and the like includes the "item number" for identifying each information item included in the temporary non-target information 134a, "identification information" for setting identification information of each non-target region, and the "position information" in which the position on the image of the non-target region is set. In the "position information", information indicating the vertex of the area (rectangular area) identified by the information set in the "identification information" is set.

Specifically, in a case where the unit area UN22 illustrated in FIG. 17 is managed as the non-target region EX31, as illustrated in FIG. 18, the information management unit 116 sets "EX31" as the "identification information" of information where the "item number" is "1" and sets "(300, 310, 200 and 190)" as the "position information".

Since the non-target information 134 and the temporary non-target information 134a have the same contents, a description of a specific example of the non-target information 134 will be omitted.

Subsequently, as illustrated in FIG. 19, for example, in a case where the comparison of a unit area UN23 included in the comparison target image 132a is performed, the difference detecting unit 112 determines that the region is the region where the unit area UN23 and the reference image 131 illustrated the unit region (not illustrated) corresponding to the unit region UN23 among the unit regions included in the reference image 131 in FIG. 12 or the like match (NO in S32, S33, and S34).

Next, as illustrated in FIG. 20, in a case of comparing the unit area UN24 included in the comparison target image 132a, for example, the difference detecting unit 112 determines that unit area UN24 and a unit region (not illustrated) corresponding o the unit region UN24 among the unit region included in the reference image 131 illustrated in FIG. 12 or the like are the different regions (YES in S32, S33, and S34).

In this case, the temporary non-target information 134a illustrated in FIG. 18 includes information on the non-target region EX31. Therefore, for example, in a case where the distance between the area indicated by the information set in the "position information" of the information in which "EX31" is set to the "identification information" in the temporary non-target information 134a illustrated in FIG. 18 and the unit area UN24 is within the threshold value, as illustrated in FIG. 21, the information management unit 116 deletes (expands) the non-target region EX31 to generate the non-target region EX31 (Yes in S42, S44 and S45). Specifically, as illustrated in FIG. 22, the information management unit 116 generates the temporary non-target information 134a including the information corresponding to the non-target region EX32 instead of the non-target region EX31. That is, in this case, the information management unit 116 generates the temporary non-target information 134a so as to include information corresponding to the non-target region EX32 obtained by integrating the non-target region EX31 and the non-target region corresponding to the unit area UN24. The information management unit 116 stores the generated temporary non-target information 134a in the information storage area 130.

In this case, in this case, the information management unit 116 may manage the non-target region EX31 and a non-target region EX32-2 corresponding to the unit area UN24 as separate regions without deleting the non-target region EX31. Specifically, as illustrated in FIG. 23, the information management unit 116 may add information corresponding to the non-target region EX32-2 to the temporary non-target information 134a illustrated in FIG. 18.

Specific Examples (2) of Processing from S32 to S36

Next, the processing in the case where a comparison target image 132b is acquired in the processing of S12 after the temporary non-target information 134a illustrated in FIG. 22 is stored in the information storage area 130 as the non-target information 134 will be described. FIGS. 24 and 25 are diagrams illustrating the specific examples of the comparison target image 132b.

Specifically, the information indicating the time included in the comparison target image 132b illustrated in FIG. 24 or the like is set to "10:52" as the information indicating the time, unlike the comparison target image 132a illustrated in FIG. 13 and the like.

For example, as illustrated in FIG. 24, in a case where the comparison of a unit area UN25 included in the comparison target image 132a is performed, the difference detecting unit 112 determines that the unit region UN25 and a unit region (not illustrated) corresponding to the unit region UN25 among the unit regions included in the reference image 131 illustrated in FIG. 12 or the like are the different regions (YES in S32, S33, and S34).

In this case, the temporary non-target information 134a illustrated in FIG. 22, for example, includes information on the non-target region EX32. Therefore, for example, in a case where the distance between the area indicated by the information set in the "position information" of the information in which "EX32" is set to the "identification information" in the temporary non-target information 134a illustrated in FIG. 18 and the unit area UN25 is within the threshold value, as illustrated in FIG. 25, the information management unit 116 deletes (expands) the non-target region EX32 to generate the non-target region EX33 (Yes in S42, S44 and S45). Specifically, as illustrated in FIG. 26, the information management unit 116 generates the temporary non-target information 134a including the information corresponding to the non-target region EX33 instead of the non-target region EX32. Then, the information management unit 116 stores the generated temporary non-target information 134a in the information storage area 130.

Specific Examples (3) of Processing from S32 to S36

Next, the processing in the case where a comparison target image 132c illustrated in FIG. 27 is acquired in the processing of S12 after the temporary non-target information 134a illustrated in FIG. 26 is stored in the information storage area 130 as the non-target information 134 will be described. FIG. 27 is a diagram illustrating the specific example of the comparison target image 132c.

Specifically, the information indicating the time included in the comparison target image 132c illustrated in FIG. 27 is set to "PM" and "21:34" as the information indicating the time, unlike the comparison target image 132b illustrated in FIG. 24 and the like. In this case, for example, the information management unit 116 generates the temporary non-target information 134a including information corresponding to the non-target region EX34 and information corresponding to the non-target region EX35 illustrated in FIG. 27, and stores the generated non-target information 134 in the information storage area 130.

Therefore, when the information processing device 1 according to the present embodiment compares the reference image 131 with the comparison target image 132 to detect a different portion, the information processing device 1 sets the detected different portion or a region in a vicinity of the different portion as a non-target region to be detected as the different portion when compared with the reference image 131.

That is, for example, in a case where the different portion exists between the reference image 131 and the comparison target image 132, the information processing device 1 according to the present embodiment set a region including the different portion as the non-target region in a case of comparing with a new comparison target image 132. Specifically, for example, in a case where designating that the different portion between the reference image 131 and the comparison target image 132 be the non-target region is received, the information processing device 1 sets the different portion as the non-target region.

Accordingly, the information processing device 1 can automatically expand the non-target region each time when the comparison between the reference image 131 and the comparison target image 132 is performed. Therefore, the information processing device 1 can improve the comparison accuracy between the reference image 131 and the comparison target image 132. Accordingly, the information processing device 1 can efficiently perform the screen confirmation test.

In the processing of S32, the information processing device 1 may use one dot in the reference image 131 and the comparison target image 132 as a unit region. In this case, in the processing of S34, by comparing the color of the unit area included in the reference image 131 with the color of the unit area included in the comparison target image 132, the information processing device 1 may perform the determination whether each unit region is the different region.

<Comparison Processing in Second Embodiment>

Figure 28:
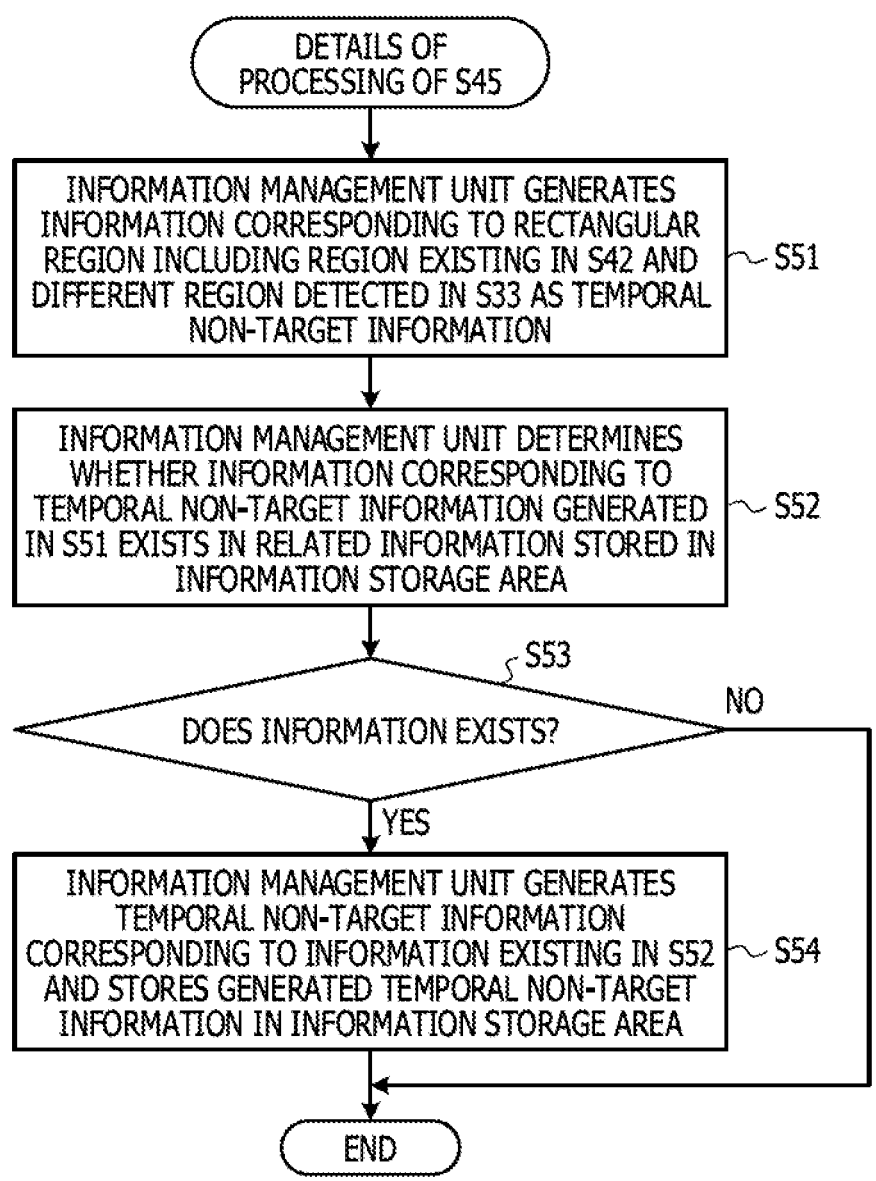
FIG. 28 is a flowchart illustrating comparison processing in a second embodiment.

Next, comparison processing in a second embodiment will be described. FIG. 28 is a flowchart illustrating comparison processing in the second embodiment. FIG. 29 is a diagram illustrating a specific example of the related information 133. The comparison processing illustrated in FIG. 28 will be described with reference to FIG. 29. The comparison processing in the second embodiment is different from the comparison processing in the first embodiment only in the processing of S45. Therefore, hereinafter, only the processing in S45 in the second embodiment will be described.

As illustrated in FIG. 28, the information management unit 116 generates a new temporary non-target information 134a corresponding to the rectangular area including the area existing in the processing of S42 and the different region detected in the processing of S34 (S51). Then, the information management unit 116 determines whether the information corresponding to the temporary non-target information 134a generated in the processing of S51 exists in the related information 133 stored in the information storage area 130 (S52). Hereinafter, a specific example of the related information 133 will be described.

<Specific Example of Related Information>

FIG. 29 is a diagram illustrating a specific example of the related information 133.

The related information 133 illustrated in FIG. 29 includes "item number" for identifying each information included in the related information 133, "reference character type" in which the type of character included in each area is set, and the "reference character type" "adjacent character type" in which the type of character positioned adjacent to the character of which type is set is set as the item.

Specifically, in the related information 133 illustrated in FIG. 29, the "numeric character" is set as "reference character type" in information whose "item number" is "1", and the "numeric character" is set as "adjacent character type". In addition, in the related information 133 illustrated in FIG. 29, the "numeric character" is set as "reference character type" in information whose "item number" is "1", and ":" is set as "adjacent character type".

For example, in the processing of S51, in a case where the non-target region EX32 illustrated in FIG. 21 is generated, the information management unit 116 specifies the "numeric character" as the type of character ("9") included in the generated non-target region EX32 illustrated in FIG. 21. Thereafter, referring to the related information 133 illustrated in FIG. 29, the information management unit 116 specifies the "numeric character" that is information set as "adjacent character type" of information in which "numeric character" is set as "reference character type" and ":".

Returning to FIG. 28, in a case where it is determined that there is information indicating the region corresponding to the temporary non-target information 134a generated in the processing of S51 in the related information 133 stored in the information storage area 130 (YES in S53), the information management unit 116 generates the temporary non-target information 134a corresponding to the information determined to exist in the processing of S53 and stores the generated temporary non-target information 134a in the information storage area 130 (S54). On the other hand, in a case where it is determined that there is no information indicating the region corresponding to the temporary non-target information 134a generated in the processing of S51 in the related information 133 stored in the information storage area 130 (NO in S53), the information management unit 116 does not perform the processing of S53.

That is, "4", ":", "0", and "1" that are "numerical number character" or ":" exist at positions adjacent to the character "9" included in the non-subject region EX32 illustrated in FIG. 21, respectively. Therefore, the information management unit 116 also specifies the regions (unit regions) including "4", ":", "0", and "1" as the non-target regions in the processing of S54. The information management unit 116 generates the temporary non-target information 134a corresponding to the specified non-target region and stores the temporary non-target information 134a in the information storage area 130.

Accordingly, the information management unit 116 can suppress the frequency at which the processing of S35 is performed and can reduce the processing burden desired for generating the temporary non-target information 134a.

<Comparison Processing in Third Embodiment>

Figure 30:
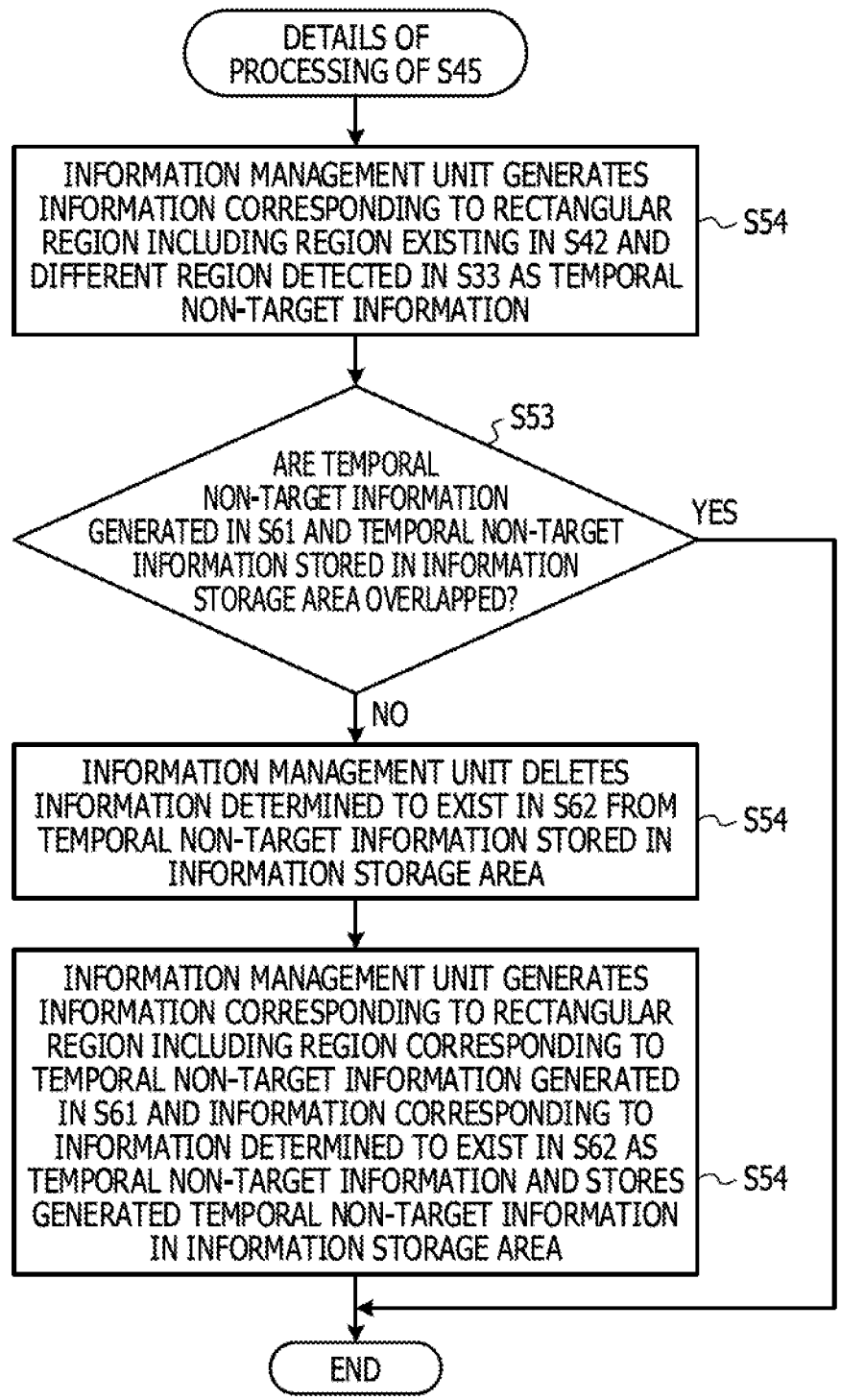
FIG. 30 is a flowchart illustrating comparison processing in a third embodiment.

Next, comparison processing in a third embodiment will be described. FIG. 30 is a flowchart illustrating the comparison processing in the third embodiment. The comparison processing in the third embodiment is different from the comparison processing in the first embodiment only in the processing of S45. Therefore, only the processing of S45 in the third embodiment will be described below.

As illustrated in FIG. 30, the information management unit 116 generates new temporary non-target information 134a corresponding to the rectangular region including the region existing in the processing of S42 and the different region detected in the processing of S34 (S61). The information management unit 116 determines whether there is information overlapping with the temporary non-target information 134a generated in the processing of S61 in the temporary non-target information 134a stored in the information storage area 130 (S62).

As a result, in a case where it is determined that there is information overlapping with the temporary non-target information 134a generated in the processing of S61 (YES in S62), the information management unit 116 deletes the information determined to exist in the processing of S62 from the temporary non-target information 134a stored in the information storage area 130 (S63). The information management unit 116 generates information corresponding the rectangular area including the region corresponding to the temporary non-target information 134a generating in processing of S61 and the region corresponding to the information determined to exist in the processing of S62 as the temporary non-target information 134a, and stores the information in the information storage area 130 (S64).

Accordingly, the information management unit 116 may reduce a probability that the temporary non-target information 134a (non-target information 134) including information corresponding to overlapping regions is stored in the information storage area 130. Therefore, the information processing device 1 can perform the comparison processing more efficiently.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium for storing a comparison program, the comparison program causing a processor to execute a process, the process comprising:
    detecting a different portion between a reference image and a comparison target image by comparing the reference image and the comparison target image;
    setting at least one of the different portion and a region in a vicinity of the different portion as a non-target region to be detected as the different portion when compared with the reference image.

2. The non-transitory computer-readable storage medium according to claim 1,
    wherein in performing the setting,
    determining whether the detected different portion is already set as the non-target region, and
    in a case where the different portion is not set as the non-target region, at least one of the different portion and the region in the vicinity of the different portion is set as the non-target area.

3. The non-transitory computer-readable storage medium according to claim 1, the process further comprising:
    displaying information indicating the different portion or the region in the vicinity of the different portion on a display unit; and receiving designation whether the different portion or the region in the vicinity of the different portion is set as a non-target region to be detected as a different portion when compared with the reference image, wherein in performing the setting, the setting is performed according to the received designation.

4. The non-transitory computer-readable storage medium according to claim 3, the process further comprising:

comparing the reference image and other comparison target images and detecting a new different portion after performing the setting;

displaying the new different portion or a region in the vicinity of the new different portion on the display unit;

receiving an additional designation whether to add the new different portion or the region in the vicinity of the new different portion to a non-target region to be detected as a different portion when compared with the reference image; and performing setting the new different portion or the region in the vicinity of the new different portion as a non-target region to be detected as a different portion when compared with the reference image according to the received additional designation.

5. The non-transitory computer-readable storage medium according to claim 4, wherein the comparison target image and the other comparison target image are images acquired from the same screen at different timings.

6. The non-transitory computer-readable storage medium according to claim 3, the process further comprising:

comparing the reference image and other comparison target images and detecting a new different portion after performing the setting;

displaying a region obtained by integrating the region which is already set as the non-target region and the new different portion or the region in the vicinity of the new different portion on the display unit;

receiving an additional designation whether to set the integrated region as a non-target region to be detected as the different portion when compared with the reference image; and performing setting the integrated region as the non-target region to be detected as the different portion when compared with the reference image according to the received additional designation.

7. A non-transitory computer-readable storage medium for storing a comparison program, the comparison program causing a processor to execute a process, the process comprising:

comparing a reference image and a comparison target image and detecting a different portion;

determining whether information indicating a first region including the detected different portion is stored in a storage unit by referring to the storage unit configured to store information for defining a region satisfying a predetermined condition; and in a case where the information indicating the first region is stored in the storage unit, performing setting the first region as a non-target region to be detected as the different portion when compared with the reference image.

8. The non-transitory computer-readable storage medium according to claim 7, the process further comprising:

displaying the information indicating the first region on a display unit; and receiving a designation whether to set the first region as the non-target region to be detected as the different portion when compared with the reference image, wherein in performing the setting, the setting is performed according to the received designation.

9. A comparison apparatus comprising:

a memory configured to store instructions; and a processor configured to execute the instructions stored in the memory, the instructions causing the processor to perform a comparison process including:

detecting a different portion between a reference image and a comparison target image by comparing the reference image and the comparison target image; and setting at least one of the different portion and a region in a vicinity of the different portion as a non-target region to be detected as the different portion when compared with the reference image.

10. A comparison apparatus comprising: a memory configured to store instructions; and a processor configured to execute the instructions causing the processor to perform a comparison process including: comparing a reference image and a comparison target image and detecting a different portion; determining whether information indicating a first region including the detected different portion is stored in a storage unit by referring to the storage unit configured to store information for defining a region satisfying a predetermined condition; and in a case where the information indicating the first region is stored in the storage unit, performing setting the first region as a non-target region to be detected as the different portion when compared with the reference image.

* * * * *